(12) United States Patent
Yao

(10) Patent No.: US 11,268,811 B2
(45) Date of Patent: Mar. 8, 2022

(54) NON-INTERFEROMETRIC OPTICAL GYROSCOPE BASED ON POLARIZATION SENSING

(71) Applicant: NuVision Photonics, Inc., Las Vegas, NV (US)

(72) Inventor: Xiaotian Steve Yao, Las Vegas, NV (US)

(73) Assignee: NuVision Photonics, Inc., Las Vegas, NV (US)

(*) Notice: Subject to any disclaimer, the term of this patent is extended or adjusted under 35 U.S.C. 154(b) by 14 days.

(21) Appl. No.: 16/659,282

(22) Filed: Oct. 21, 2019

(65) Prior Publication Data

US 2020/0080845 A1    Mar. 12, 2020

Related U.S. Application Data

(60) Division of application No. 15/818,653, filed on Nov. 20, 2017, now Pat. No. 10,451,420, which is a continuation of application No. 14/760,197, filed on Jul. 9, 2015, now Pat. No. 9,823,075.

(51) Int. Cl.
*G01C 19/72* (2006.01)
*G01J 4/04* (2006.01)

(52) U.S. Cl.
CPC .......... *G01C 19/721* (2013.01); *G01C 19/72* (2013.01); *G01J 4/04* (2013.01)

(58) Field of Classification Search
CPC ......... G01C 19/721; G01C 19/72; G01J 4/04; G01J 4/00; G01N 21/21
See application file for complete search history.

(56) References Cited

U.S. PATENT DOCUMENTS

| | | | | |
|---|---|---|---|---|
| 4,372,685 A | * | 2/1983 | Ulrich | G01P 13/045 356/464 |
| 4,440,498 A | | 4/1984 | Sheem | |
| 4,456,377 A | * | 6/1984 | Shaw | G01C 19/72 356/460 |
| 4,461,574 A | * | 7/1984 | Shaw | G01C 19/72 356/460 |
| 4,653,917 A | * | 3/1987 | Moeller | G01C 19/725 356/466 |
| 4,702,600 A | * | 10/1987 | Handrich | G01C 19/721 356/461 |
| 5,153,676 A | | 10/1992 | Bergh | |
| 5,227,623 A | * | 7/1993 | Heffner | G01J 4/00 250/225 |
| 5,245,407 A | | 9/1993 | Nishiura | |
| 5,260,768 A | | 11/1993 | Cordova et al. | |
| 5,335,064 A | | 8/1994 | Nishiura et al. | |

(Continued)

FOREIGN PATENT DOCUMENTS

EP    0577897 A1    1/1994

OTHER PUBLICATIONS

Bergh, R.A., et al., "All-single-mode fiber optic gyroscope," Optics Letters, 6(4):198-200, Apr. 1981.

(Continued)

*Primary Examiner* — Mohamed K Amara
(74) *Attorney, Agent, or Firm* — Perkins Coie LLP

(57) ABSTRACT

Techniques and devices for optical sensing of rotation based on measurements and sensing of optical polarization or changes in optical polarization due to rotation without using optical interferometry.

10 Claims, 20 Drawing Sheets

(56) References Cited

U.S. PATENT DOCUMENTS

| | | | |
|---|---|---|---|
| 5,455,676 A | 10/1995 | Nishiura et al. | |
| 5,469,257 A | 11/1995 | Blake et al. | |
| 5,677,767 A * | 10/1997 | Shirasaki | G01C 19/72 356/460 |
| 5,818,626 A | 10/1998 | Engstrom | |
| 6,178,036 B1 | 1/2001 | Yao | |
| 6,229,937 B1 * | 5/2001 | Nolan | G02B 6/105 385/11 |
| 6,259,089 B1 * | 7/2001 | Vali | G01C 19/722 250/227.19 |
| 6,836,327 B1 | 12/2004 | Yao | |
| 7,157,687 B1 | 1/2007 | Yao | |
| 7,158,569 B1 * | 1/2007 | Penner | H04B 1/66 375/240 |
| 7,187,870 B2 | 3/2007 | Ilchenko et al. | |
| 7,265,837 B1 | 9/2007 | Yao | |
| 7,372,568 B1 | 5/2008 | Yao | |
| 7,436,569 B2 | 10/2008 | Yao et al. | |
| 7,561,269 B2 | 7/2009 | Kaushal et al. | |
| 7,696,748 B2 * | 4/2010 | Schlicker | G01N 27/9046 324/240 |
| 7,723,670 B1 | 5/2010 | Yan et al. | |
| 8,164,742 B1 * | 4/2012 | Carrieri | G01N 21/21 356/5.01 |
| 8,164,831 B2 | 4/2012 | Yao et al. | |
| 9,115,993 B1 * | 8/2015 | Dahlgren | G01C 19/72 |
| 9,823,075 B2 | 11/2017 | Yao | |
| 10,712,180 B2 * | 7/2020 | Laine | G01D 5/35322 |
| 2003/0007151 A1 | 1/2003 | Eckert | |
| 2003/0043697 A1 | 3/2003 | Vakoc | |
| 2003/0184751 A1 * | 10/2003 | Saitoh | G01J 4/00 356/369 |
| 2003/0214713 A1 | 11/2003 | Collett et al. | |
| 2004/0124344 A1 * | 7/2004 | Rasmussen | G01J 4/00 250/225 |
| 2005/0200941 A1 | 9/2005 | Yao | |
| 2005/0265728 A1 | 12/2005 | Yao | |
| 2006/0023987 A1 | 2/2006 | Yao | |
| 2006/0038999 A1 * | 2/2006 | Hentschel | G01J 4/00 356/364 |
| 2006/0114470 A1 | 6/2006 | Takashima et al. | |
| 2007/0046921 A1 | 3/2007 | Takahashi et al. | |
| 2007/0146723 A1 | 6/2007 | Chuss et al. | |
| 2007/0223078 A1 | 9/2007 | Yao et al. | |
| 2008/0030839 A1 | 2/2008 | Yao | |
| 2008/0054160 A1 | 3/2008 | Yao | |
| 2010/0073681 A1 | 3/2010 | Qiu et al. | |
| 2010/0157310 A1 | 6/2010 | Bennett et al. | |
| 2010/0328640 A1 | 12/2010 | Uemura | |
| 2011/0255094 A1 | 10/2011 | Mohageg et al. | |
| 2013/0188177 A1 * | 7/2013 | Lovely | G01M 11/332 356/73.1 |
| 2016/0116288 A1 | 4/2016 | Song et al. | |
| 2018/0202809 A1 | 7/2018 | Yao | |
| 2019/0234739 A1 | 8/2019 | Yao | |

OTHER PUBLICATIONS https://en.wikipedia.org/wiki/Stokes_parameters.

International Search Report and Written Opinion dated May 5, 2014 for International Application No. PCT/US2014/010940, filed Jan. 9, 2014 (9 pages).

Lefevre, H.C., "Fundamentals of the Interferometric Fiber-Optic Gyroscope," Optical Review, 4(1A):20-27, Jan. 1997.

Lynch Master's dissertation thesis, "Orthogonal Polarization Fiber Optic Gyroscope with Improved Bias Drift," MIT, 76 pages, May 1999, retrieved from <https://dspace.mit.edu/bitstream/handle/1721.1/80636/47095091-MIT.pdf? sequence=2>.

Sanders, G.A., et al., "Fiber optic gyros for space, marine, and aviation applications," Proceedings of the SPIE, vol. 2837, pp. 61-71, Nov. 1996.

Sanders, G.A., et al., "Fiber-optic gyro development for a broad range of applications," Proceedings of the SPIE, vol. 2510, pp. 2-11, Sep. 1995.

Szafraniec, B., et al., "Theory of Polarization Evolution in Interferometric Fiber-Optic Depolarized Gyros," Journal of Lightwave Technology, 17(4):579-590, Apr. 1999.

Vali, V., et al., "Fiber ring interferometer," Applied Optics, 15(5):1099-1100, May 1976.

Bergh, Ralph A. et al., "An Overview of Fiber-Optic Gyroscopes", Journal of Lightwave Technology, vol. I.T., No. 2, Apr. 1984.

* cited by examiner

Bulk Interferometric Gyroscope

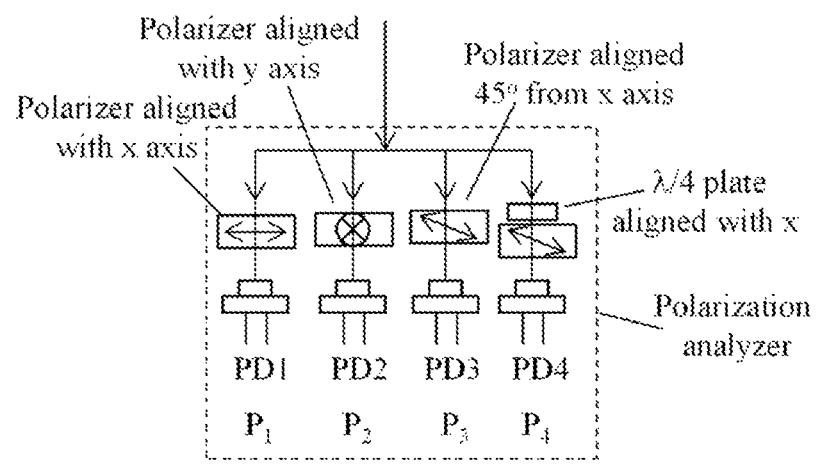
Fig.5 A complete polarization analyzer for obtaining four Stokes parameters.

US 11,268,811 B2

NON-INTERFEROMETRIC OPTICAL GYROSCOPE BASED ON POLARIZATION SENSING

CROSS REFERENCE TO RELATED APPLICATIONS

This patent document is a divisional of U.S. patent application Ser. No. 15/818,653, filed Nov. 20, 2017, which is a continuation of U.S. patent application Ser. No. 14/760,197, filed on Jul. 9, 2015, now U.S. Pat. No. 9,823,075, issued Nov. 21, 2017, which is a 371 National Phase Application of PCT/US2014/010940, filed on Jan. 9, 2014, which claims the benefit of priority of U.S. Provisional Application No. 61/751,174, entitled "NON-INTERFEROMETRIC OPTICAL GYROSCOPE BASED ON POLARIZATION SENSING," filed on Jan. 10, 2013, which is incorporated by reference in its entirety as part of the specification of this patent document.

BACKGROUND

This patent document relates to optical devices and optical sensing techniques including optical gyroscopes and optically sensing rotation.

Sensing of rotation can be used in a wide range of applications, including, e.g., navigation, motion sensing, motion control including object stability control, game console controllers, hand-held devices such as smartphones. Optical gyroscopes can be designed to use rotation-induced changes in the optical interference pattern of two counter-propagating optical beams to measure the rotation. Many optical gyroscopes are based on an optical Sagnac interferometer configuration including various interferometric fiber-optic gyroscopes (IFOGs). Such optical gyroscopes can be designed without moving parts and thus eliminate the wear and tear in other gyroscopes with an oscillating proof mass or a moving component. IFOGs are commercialized and in mass production for various military and civilian applications.

FIGS. 1 and 2 show two examples of optical interferometric gyroscopes based on a Sagnac interferometer. FIG. 1 shows a bulk design and FIG. 2 shows a IFOG design based on a fiber loop. To increase the sensitivity and reliability, a relatively long length of fiber coil (e.g., hundreds to thousands meters of fiber) may be used. FIG. 2 further shows an example of a phase modulation mechanism in the IFOG to bias the gyro at a most sensitive point, and a closed loop circuit that is used to increase IFOG's dynamic range and improve its detection sensitivity.

SUMMARY

This patent document discloses optical devices and optical sensing techniques including optical gyroscopes and optically sensing rotation.

In one aspect, a method is provided for sensing rotation based on sensing of optical polarization of light without relying on optical interferometry and includes splitting an input optical beam with an input optical polarization into a first optical beam with a first optical polarization and a second optical beam with a second optical polarization that is orthogonal to the first optical polarization; coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction; combining light of the first and second optical beams at the input/output port, while maintaining the first and second optical beams to be orthogonal to each other without causing optical interference between the first and second optical beams at the input/output port, to produce a combined optical beam as an optical output of the optical loop; detecting the optical output to obtain information on optical polarization of the optical output; and processing the obtained information on optical polarization of the optical output to determine the rotation experienced by the optical loop.

In another aspect, an optical gyroscope is provided for sensing rotation based on sensing of optical polarization of light without relying on optical interferometry. This optical gyroscope includes an optical input/output device that splits an input optical beam with an input optical polarization into a first optical beam with a first optical polarization and a second optical beam with a second optical polarization that is orthogonal to the first optical polarization; and an optical loop coupled to the optical input/output device and having a first loop end to receive the first optical beam to propagate in the optical loop in a first loop direction and a second loop end to receive the second optical beam to propagate in the optical loop in a second loop direction opposite to the first loop direction. The optical input/output device is configured to combine light of the first and second optical beams from the optical loop while maintaining the first and second optical beams to be orthogonal to each other without causing optical interference between the first and second optical beams at the optical input/output device, to produce a combined optical beam as an optical output of the optical loop. This device further includes a detection device that detects the optical output to obtain information on optical polarization of the optical output and processes the obtained information on optical polarization of the optical output to determine the rotation experienced by the optical loop.

In another aspect, an optical gyroscope is provided for sensing rotation based on sensing of optical polarization of light without relying on optical interferometry. This optical gyroscope includes means for splitting an input optical beam with an input optical polarization into a first optical beam with a first optical polarization and a second optical beam with a second optical polarization that is orthogonal to the first optical polarization; and means for coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction. This optical gyroscope further includes means for combining light of the first and second optical beams at the input/output port, while maintaining the first and second optical beams to be orthogonal to each other without causing optical interference between the first and second optical beams at the input/output port, to produce a combined optical beam as an optical output of the optical loop; means for detecting the optical output to obtain information on optical polarization of the optical output; and means for processing the obtained information on optical polarization of the optical output to determine the rotation experienced by the optical loop.

In another aspect, a method for sensing rotation based on sensing of optical polarization of light without relying on optical interferometry is provided to include directing input light of an input optical polarization into a closed optical loop that is subject to a rotation; coupling the light in the closed optical loop out as an optical output of the closed optical loop; detecting the optical output to obtain information on optical polarization of the optical output without relying on optical interference of light in connection with the closed optical loop; and processing the obtained information on optical polarization of the optical output to determine the rotation experienced by the closed optical loop.

In yet another aspect, an optical gyroscope is provided for sensing rotation based on sensing of optical polarization of light without relying on optical interferometry and includes a closed optical loop that is subject to a rotation and includes an input/output port to receive input light having an input optical polarization prior to entry of the closed optical loop, the input/output port coupling the light in the closed optical loop out as an optical output of the closed optical loop; a detector unit detecting the optical output to obtain information on optical polarization of the optical output without relying on optical interference of light in connection with the closed optical loop; and a processing unit processing the obtained information on optical polarization of the optical output to determine the rotation experienced by the closed optical loop.

Those and other aspects and their implementations, variations and enhancements are described in greater detail in the drawings, the description and the claims.

BRIEF DESCRIPTION OF DRAWINGS

FIG. 3A shows a non-reciprocal configuration: relying on the condition that no differential phase shift between two polarizations at PBS and at reflectors, the polarization rotation of the output light only depends on the gyro rotation. FIG. 3B shows a reciprocal configuration: a 90° Faraday rotator or a half wave plate is used to rotate y into x so that the counter propagating beams experience the same phase from reflectors and PBS.

FIG. 5 shows an example of a complete polarization analyzer for obtaining four Stokes parameters.

FIG. 13A shows the device layout and FIG. 13B shows the directions of the two PBS (same orientation) and the quarter wave plate with respect to the PBS or Wollaston prism in FIGS. 7, 8A, 8B and 9. The two PBS' have the same orientation with respect to x and y directions.

FIG. 14B shows an example of directions of axes of the Wollaston prism and the quarter wave plate with respect to the directions x and y of the polarization beam splitter before the fiber coil.

FIG. 15B shows the preferred directions of a Wollaston prism's axis and the quarter wave plate with respect to the directions x and y of the polarization beam splitter before the fiber coil. The two Wollaston prisms have the same orientation with respect to x and y directions.

DETAILED DESCRIPTION

Figure 1:
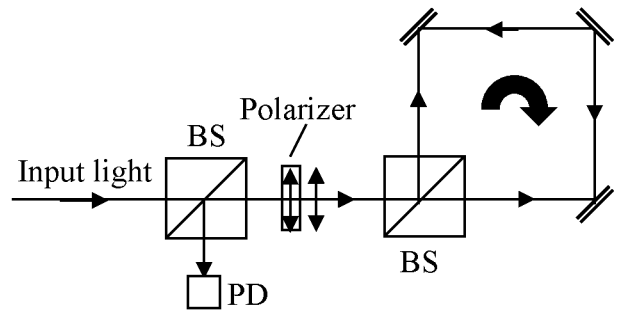
FIG. 1 shows an example of a bulk interferometric optic gyroscope.
Figure 2:
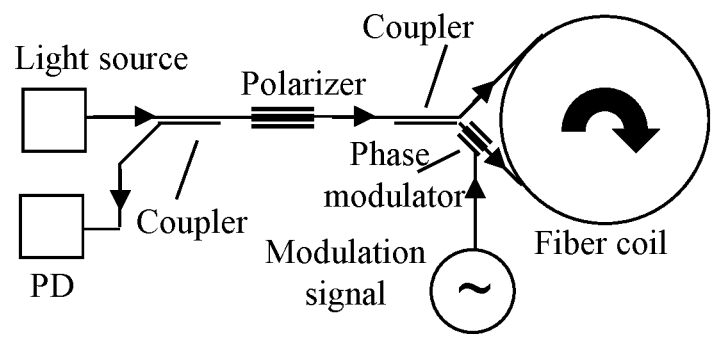
FIG. 2 shows an example of an interferometric fiber optic gyroscope.

This patent document discloses techniques and devices for optical sensing of rotation based on measurements and sensing of optical polarization or changes in optical polarization due to rotation without using optical interferometry. Based on the present optical sensing of rotation from optical polarization, optical gyroscopes can be constructed for a wide range of applications, including but not limited to applications in aircrafts, vessels, and land vehicles and applications in various sensors and devices such as handheld communication devices like tablets and smartphones, game controllers and others for precision rotation rate and angle detection.

In some implementations, a method is provided for sensing rotation based on sensing of optical polarization of light without relying on optical interferometry to direct input light of an input optical polarization into a closed optical loop that is subject to a rotation; couple the light in the closed optical loop out as an optical output of the closed optical loop; detect the optical output to obtain information on optical polarization of the optical output without relying on optical interference of light in connection with the closed optical loop; and process the obtained information on optical polarization of the optical output to determine the rotation experienced by the optical loop. In other implementations, a method is provided for sensing rotation based on sensing of optical polarization of light without relying on optical interferometry. Specifically, this method includes splitting an input optical beam with an input optical polarization into a first optical beam with a first optical polarization and a second optical beam with a second optical polarization that is orthogonal to the first optical polarization; coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction; and combining light of the first and second optical beams at the input/output port, while maintaining the first and second optical beams to be orthogonal to each other without causing optical interference between the first and second optical beams at the input/output port, to produce a combined optical beam as an optical output of the optical loop. In addition, this method includes detecting the optical output to obtain information on optical polarization of the optical output; and processing the obtained information on optical polarization of the optical output to determine the rotation experienced by the optical loop.

Implementations of the present optical sensing of rotation from optical polarization can include optical gyroscopes that detect polarization variations caused by rotation. A closed optical loop can be used to use two counter propagating optical beams to sense the rotation of the closed optical loop—specifically, e.g., measuring a rotation component that has a rotation axis perpendicular to a plane of the closed optical loop.

Figure 3A:
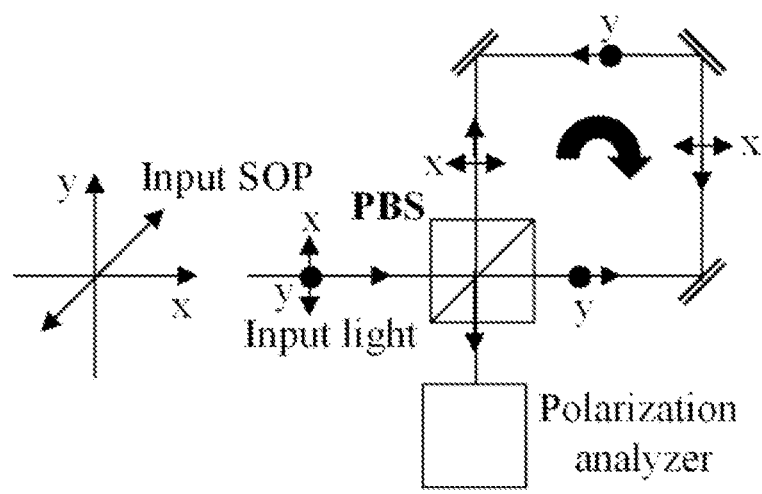
FIGS. 3A and 3B show two examples of optical polarimetric gyroscopes in two different configurations. Input light is polarized 45° from the two polarization axes x and y of the PBS so that two polarization components have the equal power after splitting.
Figure 3B:
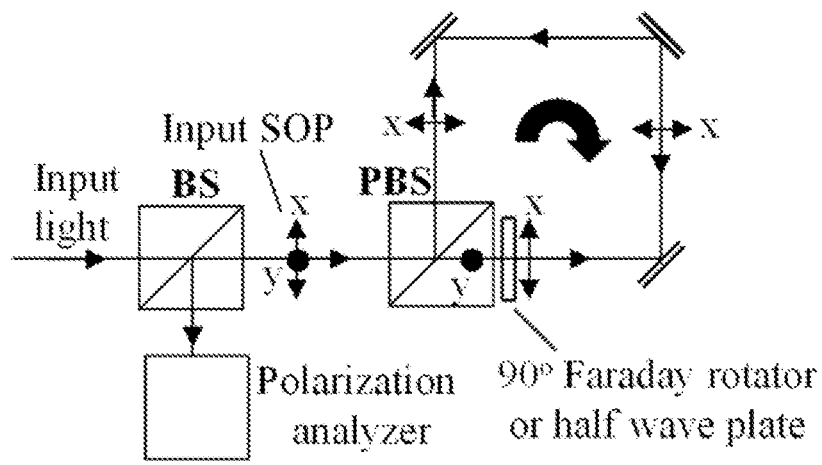
Figure 4A:
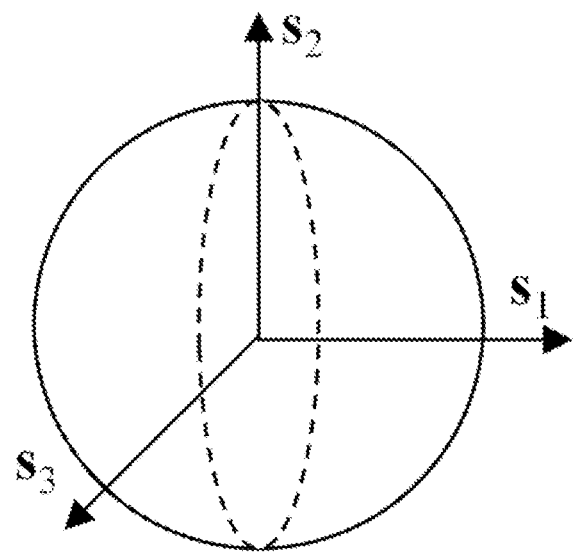
FIG. 4A shows the differential phase shift (DPS) or differential group delay (DGD) induced by the physical rotation causes the output polarization to rotate on a large circle encircling the north and south poles of the Poincare Sphere.
Figure 4B:
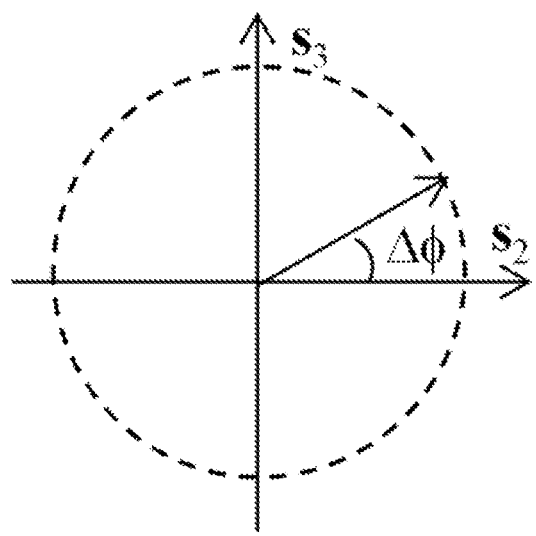
FIG. 4B shows the circular polarization trace in ($s_2$, $s_3$) plane, where Df is the DPS.

FIGS. 3A and 3B show exemplary implementations of optical gyroscopes each having a closed optical loop. An input beam of linear polarization from a light source such as a diode laser or light-emitting diode is split into two orthogonal polarization components by a polarization beam splitter (PBS). The two orthogonal components then travel in opposite directions along a closed optical loop and then recombined at the PBS. Therefore, the PBS in this example operates as an optical input/output port for the closed optical loop. The counter propagating waves experience a relative delay or differential phase when the system is under rotation. Such a relative delay is simply a differential group delay (DGD) between the two orthogonal polarization components. When two components combined at the PBS, the resulting output polarization will rotate along a large circle on enclosing the two poles (Right and left hand circular polarization) as the DGD increased, as shown in FIG. 4A and FIG. 4B. Such a polarization rotation can be measured by a polarization analyzer shown in FIG. 5, as will be described below.

The examples in FIGS. 3A and 3B are different in some aspects and share similar features in other aspects of their optical designs. In both examples, the Input light is polarized 45o from the two polarization axes x and y of the PBS so that two polarization components have the equal power after splitting. FIG. 3A uses a non-reciprocal configuration: relying on the condition that there is no differential phase shift between two polarizations at PBS and at reflectors, the polarization rotation of the output light only depends on the gyro rotation. Therefore, the design in FIG. 3A uses carefully engineered optical reflectors and PBS to ensure that there is no differential phase shift between two polarization components and thus has less tolerance to variations from specified parameters of the components used in the optical loop. FIG. 3B provides an optically reciprocal configuration: a 90° Faraday rotator or a half wave plate is used to rotate y-polarization into x-polarization so that the counter propagating beams experience the same phase from reflectors and PBS. As such, the design in FIG. 3B is optically reciprocal with respect to both directions of the optical loop and thus can have greater tolerance on imperfections, defects or variations of optical components used in the optical loop.

The electric field of the optical bean before entering the PBS in FIG. 3A or 3B can be written as:

$$\vec{E}_{in} = (E_0/\sqrt{2})(\hat{x}+\hat{y}))  \quad (1)$$

where $\hat{x}$ and $\hat{y}$ denote two passing axes or principal axes of the PBS. After the two beams of orthogonal polarizations go around the optical loop and recombined at the PBS, the electric field is then:

$$\vec{E}_{out} = (E_0/\sqrt{2})(\hat{x}+\hat{y}e^{i\Delta\phi}) \quad (2)$$

where $\Delta\phi$ is the phase difference between the counter propagating beams caused by the physical rotation of the optical loop, same as in an interferometric optic gyro, and can be expressed as:

$$\Delta\phi = 2\pi DGD/\lambda_0 = (4\pi A/\lambda_0 c)\omega, \quad (3)$$

where A is the area enclosed by the light beams, $\lambda_0$ is the center wavelength, c is the speed of light, and $\omega$ is the rotation rate. Here we assume that there is no other differential phase shift between the two polarization components when they propagate around the loop. In Eq. (2), we assume that there is no differential phase shift between two polarizations at PBS and at reflectors in FIG. 3A or 3B and that the polarization rotation of the output light only depends on the gyro rotation.

FIG. 4A shows the differential phase shift (DPS) or differential group delay (DGD) induced by the physical rotation causes the output polarization to rotate on a large circle encircling the north and south poles of the Poincare Sphere. FIG. 4B shows the circular polarization trace in (s2, s3) plane, where $\Delta\phi$ is the DPS.

FIG. 5 shows an implementation of a Stokes polarization analyzer for obtaining all the Stokes parameters for the output optical beam from the PBS. The beam is split into four portions spatially. The first one passes through a polarizer aligned with the $\hat{x}$ axis before entering a first photodetector (PD) to obtain a first optical power $P_1$ and the second portion passes through an orthogonal polarizer aligned with the $\hat{y}$ axis before entering a second photodetector to obtain a second power $P_2$. The third portion passes through a polarizer aligned 45° from the $\hat{x}$ axis before entering a third polarizer to obtain a third power $P_3$, and finally the fourth portion passes through a quarter wave plate and a fourth polarizer before entering a fourth photodetector to obtain a fourth power $P_4$. The birefringence axis of the quarter wave plate is aligned the $\hat{x}$ (or $\hat{y}$) axis and the fourth polarizer is aligned 45° from the $\hat{x}$ (or $\hat{y}$) axis. The four Stokes parameters can then be obtained as:

$$S_0 = P_1 + P_2 \quad (4)$$

$$s_1 = (P_1 - P_2)/S_0 \quad (5)$$

$$s_2 = (2P_3 - S_0)/S_0 \quad (6)$$

$$s_3 = (2P_4 - S_0)/S_0 \quad (7)$$

$$P_1 = \alpha|\vec{E}_{out} \cdot \hat{x}|^2 = \alpha E_0^2/2 \quad (8)$$

$$P_2 = \alpha|\vec{E}_{out} \cdot \hat{y}|^2 = \alpha E_0^2/2 \quad (9)$$

$$P_3 = \alpha|\vec{E}_{out} \cdot (\hat{x}+\hat{y})/\sqrt{2}|^2 = (\alpha E_0^2/2)(1+\cos\Delta\phi) \quad (10)$$

$$P_4 = \alpha|\vec{E}_{out} \cdot \tilde{T}_{QWP} \cdot (\hat{x}+\hat{y})/\sqrt{2}|^2 = (\alpha E_0^2/2)(1+\cos\Delta\phi) \quad (11)$$

where $\tilde{T}_{QWP}$ is the matrix representing a quarter wave plate and a is a coefficient including the contributions from optical loss, photodetector quantum efficiency, and electronic gain of each channel. Although the optical losses and detector efficiencies are different from different channels, the electronic gain can always be adjusted to ensure the a coefficient the same for all channels. In Eq. (11), $$\vec{E}_{out} \cdot \tilde{T}_{QWP} = (\hat{x}+\hat{y}e^{i\Delta\phi-i\pi/2}) \quad (12)$$

From Eqs. (5)-(7), the Stokes parameters of the light beam coming back from the loop are:

$$s_1 = 0 \quad (13)$$

$$s_2 = \cos\Delta\phi \quad (14)$$

$$s_3 = \sin\Delta\phi \quad (15)$$

$s_2^2 + s_3^2 = 1$ is just the circle shown in FIG. 4 and $$\Delta\phi = \tan^{-1}(s_3/s_2) \quad (16)$$

$\Delta\phi$ can also be obtained from Eq. (14) or Eq. (15), depending on the its value. For small $\Delta\phi$, Eq. (15) should be used and for large $\Delta\phi$ approaching $7\pi/2$, Eq. (14) should be used. Therefore, the polarization rotation angle is simply the differential phase between the two orthogonal polarization components and is linearly proportional to the angular rate of the rotating optic system, and no phase bias is required. By measuring the polarization rotation angle, the system's rotation rate can be obtained.

Because the polarization trace is contained in the $(s_2, s_3)$ plane, there is no need to measure $s_1$ and the measurement of $\Delta\phi$ in FIG. 5 can be simplified, as will be shown below.

Some examples of advantages of this polarimetric configuration include 1) no phase modulators is required to bias the gyro system, resulting significant cost savings; 2) the linear relationship between the polarization rotation angle and the system rotation rate, resulting better scaling factor and large dynamic range; 3) the direction of polarization rotation directly relates to the direction of physical rotation of the gyro system, eliminating the ambiguity associated with the cosine relationship of an IFOG; 4) PBS used in polarimetric optic gyroscope acts both as a beam splitter to obtaining two counter propagating waves and a polarizer to clean up unwanted polarization components when two counter propagation beams return, similar to an IOC in an IFOG; 5) Electronics is simpler and uses less power, because no modulation signal is required to drive the phase modulator and no high speed FPGA/DSP is required for the digital closed loop design. Only low power analog circuit is required for detecting the polarization rotation information.

Figure 6:
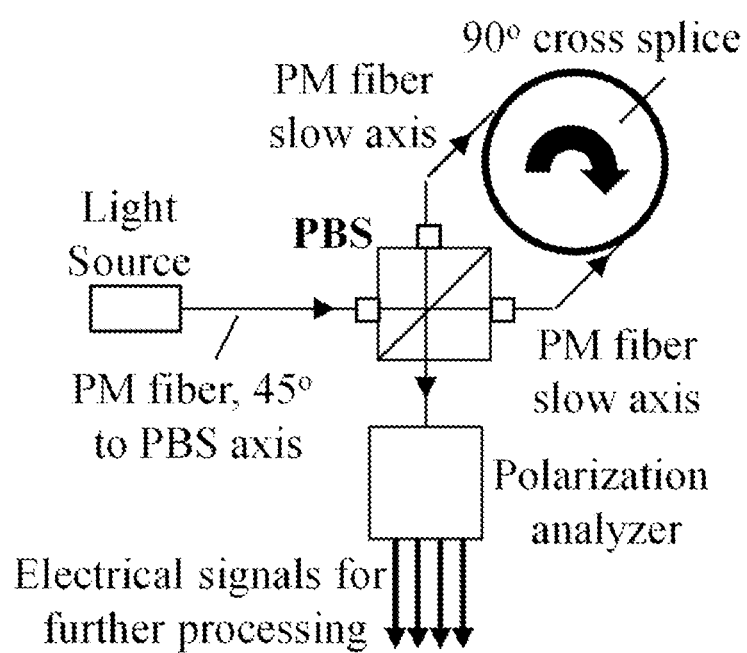
FIG. 6 shows an example of one implementation of a polarimetric fiber optic gyroscope (P-FOG) where a polarization-maintaining (PM) fiber coil is used as a rotation sensing element. To eliminate the detection bias, a 90° cross splice may be used at coil's midpoint.
Figure 7:
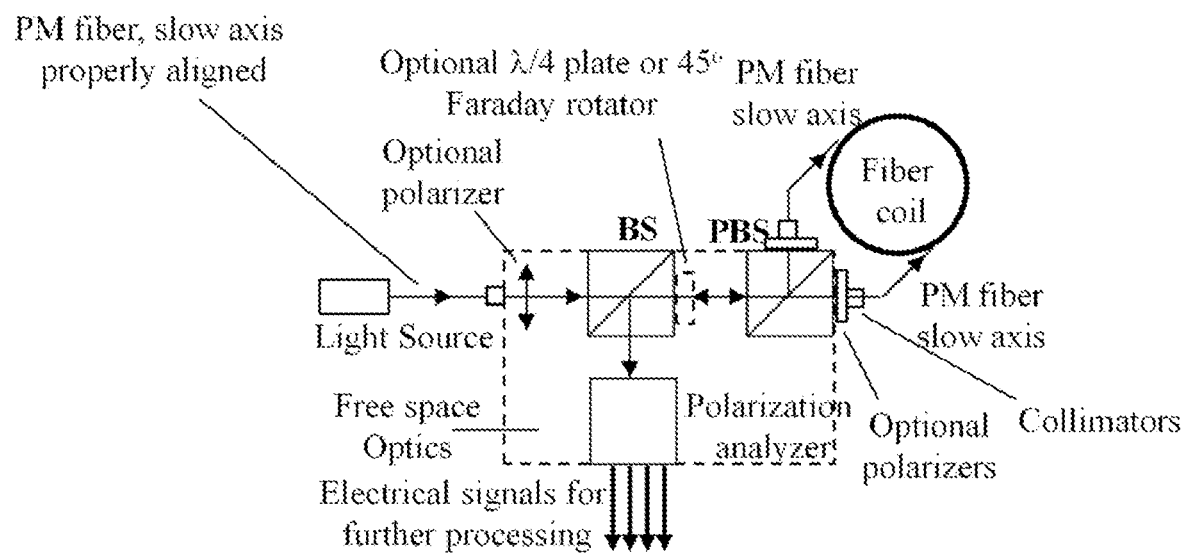
FIG. 7 shows one example of a second implementation of a polarimetric fiber optic gyroscope (P-FOG) where a PM fiber coil is used as a rotation sensing element. A polarization insensitive beam splitter (BS) is used in front of the PBS to direct the returned light from the coil to the polarization analyzer. Two polarizing fiber pigtails can be used to replace the two PM fiber pigtails for better performance.

Optical fiber can also be used in a polarimetric optic gyro to increase the detection sensitivity, as in an IFOG, as shown in FIGS. 6 and 7. Such devices are polarimetric fiber optic gyroscopes, or P-FOGs, to distinguish from its interferometric counterpart, IFOG. Note that in FIG. 6, the two outputs from the PBS can be aligned to the slow and fast axes of the polarization maintaining (PM) fiber respectively, however, a large bias corresponding to the different propagation speeds in the slow and fast axes will result. Such a bias is also sensitive to temperature variations and may result a large detection error. One way to reduce such a bias error is to cross splice the PM fiber at the mid-point of the fiber loop, as shown in FIG. 6. However, such an approach is not practical because it is difficult to find the exact midpoint. The configurations of FIGS. 3A and 6 are inherently not reciprocal and may not be suitable for certain applications that require high accuracy gyros.

FIG. 7 shows an exemplary implementation where both polarization components after the PBS are coupled into the same axis of the PM fiber (slow or fast axis). However, a beam splitter (BS) before the PBS is deployed to direct the beam coming back from the fiber coil into a polarization analyzer. Similar to the minimum configuration in an IFOG [6-7], such a configuration can eliminate all non-reciprocities caused by the optical components. Note that no 90° Faraday rotator or half wave plate is required, as in FIG. 3B, because the PM fiber can be twisted physically to give a 90° rotation.

Note that a single mode (SM), non-PM fiber coil can also be used for the P-FOG configuration disclosed in the application. Similar to an IFOG, PM fiber pigtails connecting to the outputs of the PBS are first used, with their slow (or fast) axis aligned with the direction of polarization of the two output beams. Depolarizers are then spliced to the PM fiber pigtails to depolarize the two output beams before they entering the SM fiber coil [8].

Note again that the two PM fiber pigtails connecting the two outputs of the PBS can also be replaced by two polarizing (PZ) fiber pigtails to further increase the polarization extinction ratio (PER) of the system if the PER of the PBS is not sufficient. In such an embodiment, the polarizations of the two output beams from the PBS are aligned with the passing axis of the PZ fiber pigtail. If a PM fiber coil is used, each end of the PM fiber can be directly spliced to the PZ fiber pigtail, with its slow (or fast) axis aligned with the PZ fiber. If a SM coil is used, a depolarizer is first spliced to one of the PZ fiber pigtails. The output from the depolarizer is then spliced to one end of the SM fiber coil. Alternatively, sheet polarizers, such that made from polarizing glass, can be placed at the output of the PBS to further increase the PER of the PBS.

In FIG. 7, there are three polarization alignment options for the light source: 1) the PM fiber pigtail's slow axis of the light source from left is aligned with one of the s and p axes of the BS and the PBS is physically rotated 45° from the BS to allow ideally equal power splitting for the orthogonally polarized beams at the PBS output ports; 2) the PM fiber pigtail's slow axis of the light source is aligned with one of the s and p axes of the BS and a quarter wave plate or 45° Faraday rotator is used to allow the PBS to split the input light into orthogonally polarized beams with ideally equal power; 3) the PM fiber pigtail's slow axis of the light source is aligned 45° from PBS' polarization axis to allow ideally equal power splitting for the orthogonally polarized beams at the PBS output ports. Optional polarizers can be used at the two outputs to enhance the extinction ratio of the PBS. The reason to align the input polarization from the light source to the s or p axis of the BS is to avoid potential polarization change caused by the imperfection of the BS. An optional polarizer can be placed before the BS to further clean up the polarization from the PM fiber in case the polarization extinction ratio is not sufficient. The polarizer should be aligned to the PM fiber's slow axis (or fast axis).

Figure 8A:
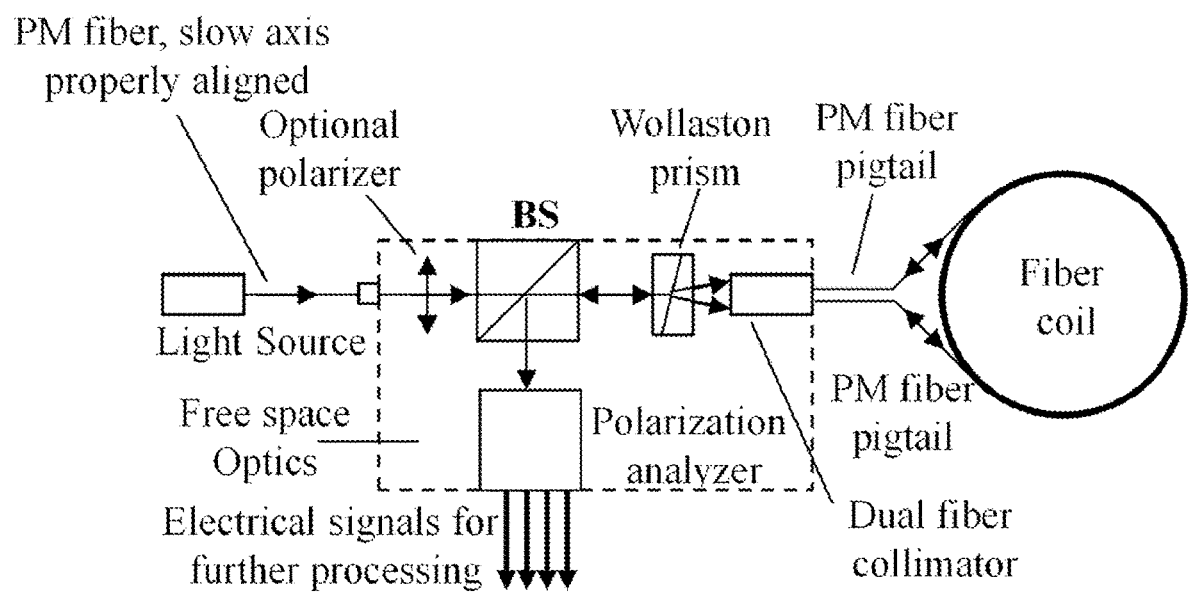
FIG. 8A shows an example of a third implementation of a polarimetric fiber optic gyroscope (P-FOG). A Wollaston prism is used as a polarization beam splitter (PBS) to direct two polarization components into different directions. A dual fiber collimator is used to receive the lights of the two orthogonal polarization components. Two polarizing fiber pigtails can be used to replace the two PM fiber pigtails for better performance.
Figure 8B:
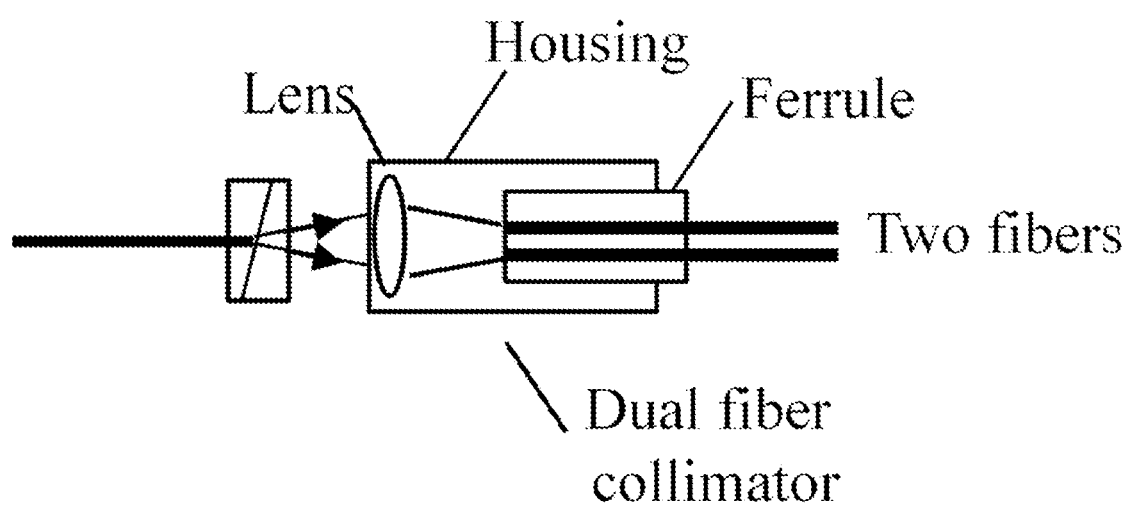
FIG. 8B shows an example of a dual fiber collimator for FIG. 8A which includes a focusing lens to receive the two beams and focus them into two fibers placed at focal plane in close proximity.

FIG. 8A shows a third embodiment where the PBS is a Wollaston prism to direct two orthogonal polarization components into two different directions. One example is that the angle between the two beams is 3.7°. FIG. 8B shows an example of a dual fiber collimator having a focusing lens to receive the two beams and focus them into two fibers placed at focal plane in close proximity. The focusing lens may be a spherical lens, a non-spherical lens, or a graded index lens, and is placed in a housing. A ferrule may be used to hold the two fibers and attached to the same housing. The separation between the two fibers may be 0.25 mm, the diameter of the fiber used. An optional polarizer can be placed before the BS to further clean up the polarization from the PM fiber in case the polarization extinction ratio is not sufficient. The polarizer should be aligned to the PM fiber's slow axis (or fast axis).

In FIGS. 7 and 8, a depolarized light source, such as ASE source, can be used. In this case, single mode (SM) fiber pigtail can be used for the light source. In addition, a polarizer must be used before the BS to polarized the light. The orientation of the polarizer is 45 degrees from the passing axis of the PBS or Wollaston prism to enable equal power splitter.

There are three major advantages to use such a configuration. First, because the Wollaston prism is made of birefringence crystals, high PER is guaranteed; second, the use of dual fiber collimator simplify the design and alignment; and finally, the size of the package can be made smaller. FIG. 8A shows an exemplary implementation in which the light source's PM fiber slow axis is aligned with one of the s and p axes of the BS and the Wollaston prism is properly rotated to allow ideally equal power splitting for the orthogonally polarized beams at the prism's output ports. Each of the polarization components is coupled into the slow (or fast) axis of a PM fiber pigtail. The fiber coil can be made with PM fiber or SM fiber. If SM fiber coil is used, a depolarizer should be used after each of the PM fiber pigtails.

Figure 9:
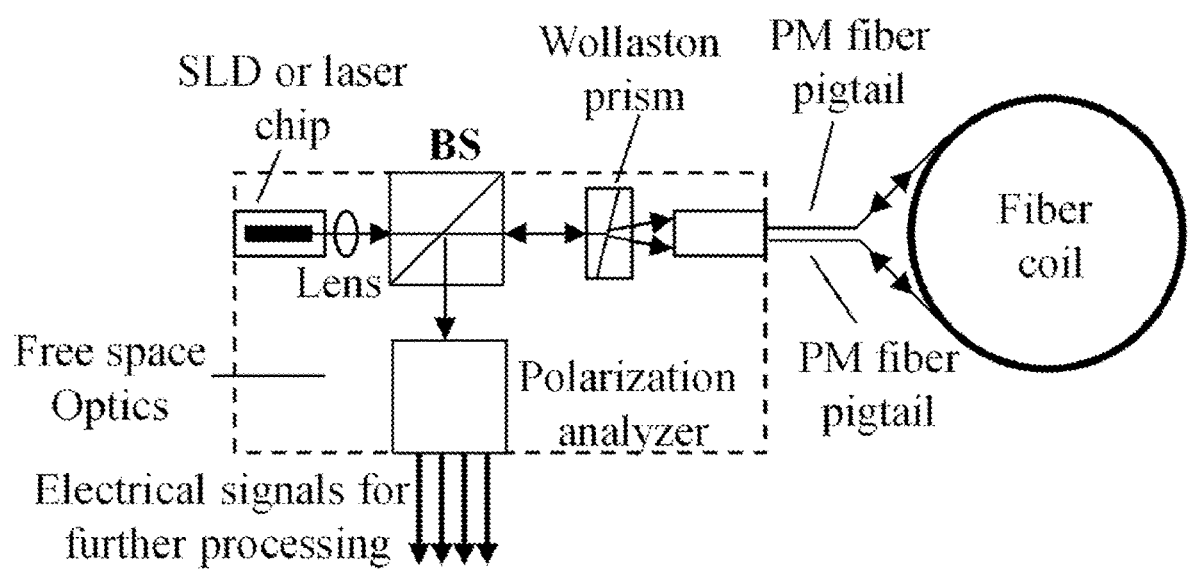
FIG. 9 shows an example of a fourth implementation of a polarimetric fiber optic gyroscope (P-FOG). Two polarizing fiber pigtails can be used to replace the two PM fiber pigtails for better performance.

FIG. 9 shows a fourth embodiment of a P-FOG where a light source, such as a super luminescent light emitting diode (SLD), a LED chip or a semiconductor laser chip, is integrated inside the same package and a Wollaston prism is used as a polarization beam splitter (PBS) to direct two polarization components into different directions. A dual fiber collimator is used to receive the lights of the two orthogonal polarization components.

In some implementations, the output polarization of the SLD can be aligned with one of the s and p axes of the BS and the Wollaston prism is properly rotated to allow ideally equal power splitting for the orthogonally polarized beams at the PBS output ports. The light source can also be included in the dashed box in FIG. 7.

Figure 10:
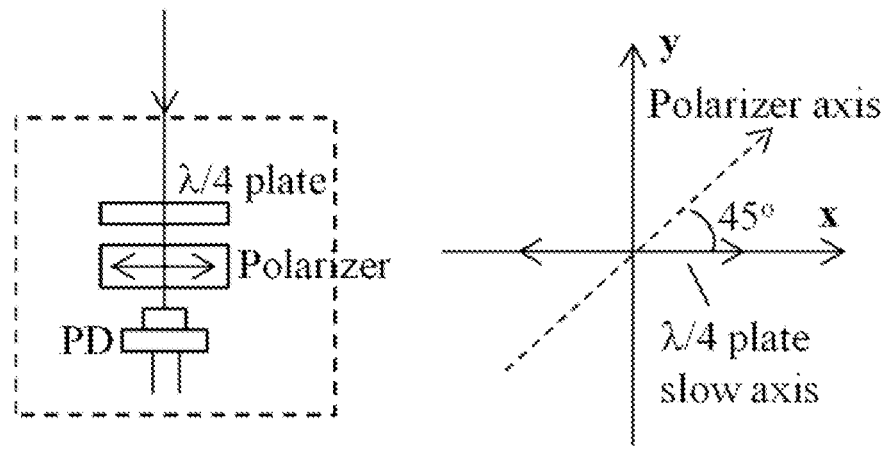
FIG. 10 shows an example of an implementation of a polarization analyzer based on. A polarizer is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation between the x and y polarization components.

FIG. 10 shows a first embodiment of the polarization analyzer. A polarizer is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation between the x and y polarization components. The polarizer's passing axis is oriented 45° from the quarter wave plate's slow axis, as shown in FIG. 10B. A photodetector detects the optical power passing through the polarizer and convert it into an electrical signal. From Eq. (2), the optical power received at the photodetector is the same that in Eq. (11) and the corresponding voltage $V_1$ is:

$$V_1 = G_1(\alpha E_0^2/2)(1+\sin \Delta\phi) = V_{10}(1+\sin \Delta\phi), \qquad (17)$$

where $G_1$ is the electrical conversion coefficient of the receiving circuit, $\alpha$ is a loss coefficient from optical components and $V_{10} = G_1(\alpha E_0^2/2)$ is the detector voltage. From Eq. (17), the rotation induced phase can be obtained as:

$$\Delta\phi = \sin^{-1}(1 - V_1/V_{10}) \qquad (18)$$

Figures 11A, 11B:
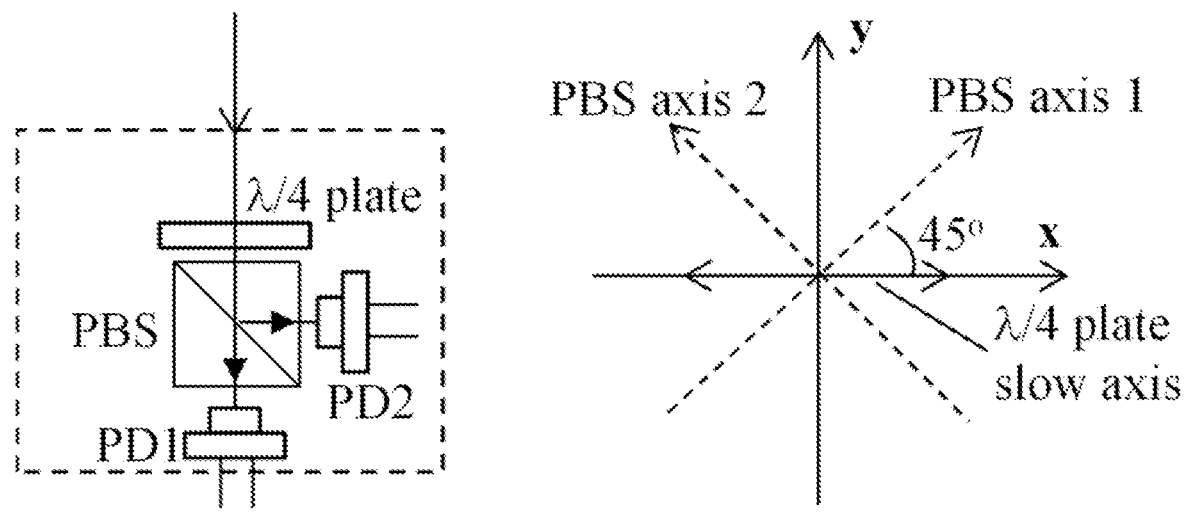
FIGS. 11A and 11B show an example of a second implementation of a polarization analyzer. A PBS is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation.

In Eq. (18), $V_{10}$ can be first obtained when setting the rotation rate to zero at the calibration stage of the P-FOG, assuming that the optical power from the light source remains constant. A problem with Eq. (18) is that any power fluctuations will cause $V_1$ to fluctuate and hence induce a measurement error. To overcome this problem, we can use a second embodiment of the polarization analyzer, as shown in FIG. 11. The voltage generated by the first photodetector is still Eq. (17) and the voltage generated by the second photodetector PD2 is $$V_2 = G_2(\alpha E_0^2/2)(1 - \sin \Delta\phi) = V_{20}(1 - \sin \Delta\phi) \quad (19)$$

One may always adjust the gain $G_2$ of the PD2's amplification circuit such that $V_{10} = V_{20} = V_0$ and take a difference between V1 and V2 to obtain the rotation induced phase:

$$\Delta\phi = \sin^{-1}[(V_1 - V_2)/(V_1 + V_2)] \quad (20)$$

Figure 12A:
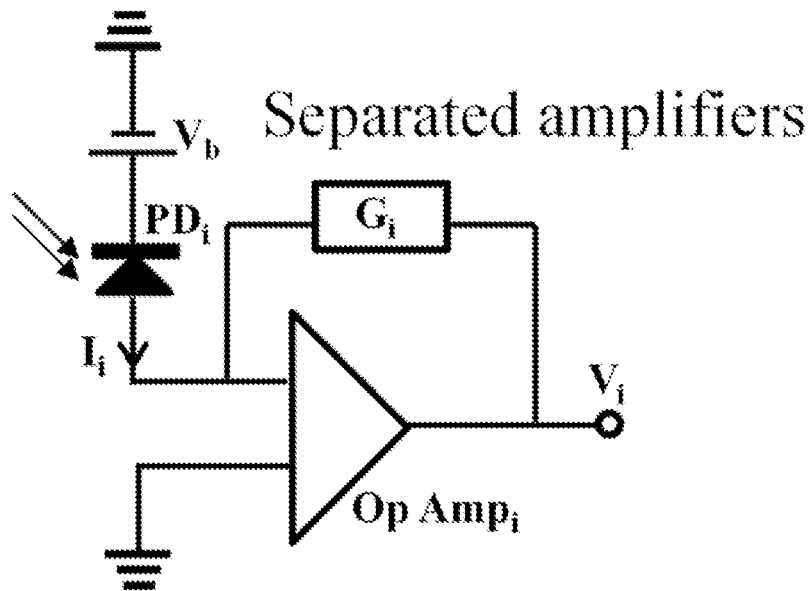
FIGS. 12A and 12B show two examples of detection circuits in two different detector configurations.

Note that in the discussions above, two separate amplifiers are used for each detector, as shown in FIG. 12A. The calculations in Eqs. 17 to 20 can be carried out using either analog circuitry or digital circuitry. When digital circuitries are used, analog-to-digital converters and microprocessors, such as microcontrollers, FPGA, or DSP must be used.

Figure 12B:
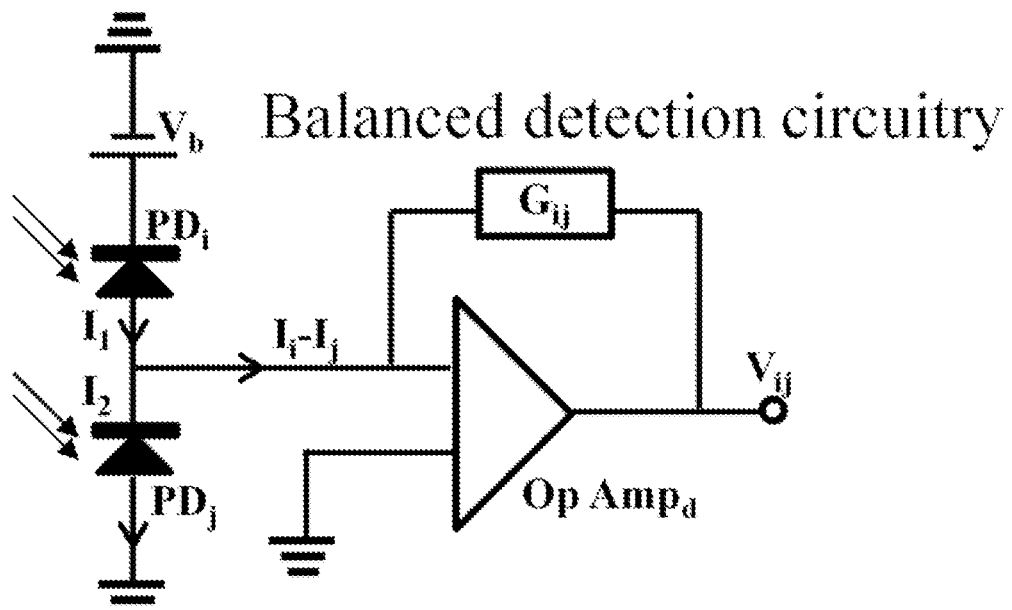

Alternatively, a balanced detection circuitry may be used to amplify differential photocurrent between PD1 and PD2 as shown in FIG. 12B:

$$V_{12} = G_{12}(I_1 - I_2) = 2G_{12}I_0 \sin \Delta\phi, \quad (21)$$

where $G_{12}$ is the trans-impedance amplifier gain of the balanced detector, $V_{12}$ is the resulting voltage, and $I_1$ and $I_2$ are the photocurrents received in PD1 and PD2 respectively:

$$I_1 = \beta_1(\alpha E_0^2/2)(1 + \sin \Delta\phi) = I_{10}(1 + \sin \Delta\phi) \quad (22)$$

$$I_2 = \beta_2(\alpha E_0^2/2)(1 - \sin \Delta\phi) = I_{20}(1 - \sin \Delta\phi) \quad (23)$$

In Eqs. (22) and (23), $\beta_i$ is proportional to the responsivity of a photodetector and its follow-on circuit. Adjusting the circuit parameters can always make $I_{10} = I_{20} = I_0$. From Eq. (21), the rotation induced phase can be obtained as:

$$\Delta\phi = \sin^{-1}[(I_1 - I_2)/(I_1 + I_2)] = \sin^{-1}[V_{12}/(2G_{12}I_0)] \quad (24)$$

Note that the use of balanced detection circuits can eliminate the power fluctuations and the relative intensity noise of the light source. Again, the calculation of Eq. (24) can be obtained by either an analog circuitry, and digital circuitry, or the combination of both that follow the Op Amp in FIG. 12B.

Figure 13A:
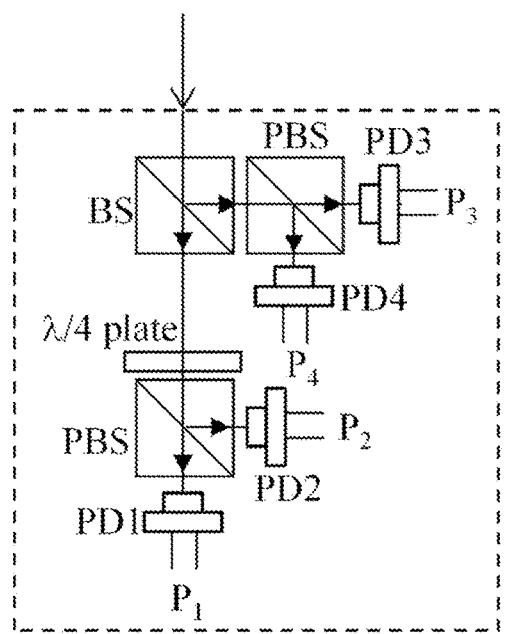
FIGS. 13A and 13B show an example of a third implementation of a polarization analyzer where
Figure 13B:
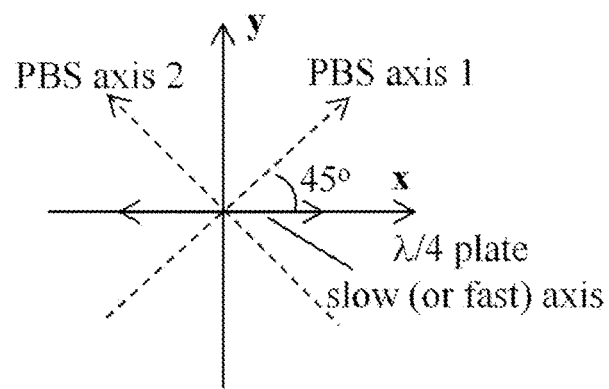

A short coming of the embodiment of FIG. 11 is that the rotation induced phase cannot exceed 90 degrees, as shown in Eqs. (20) and (24) and can only be used for gyros with small rotation rate or dynamic range. For gyros with a large detection range, a third embodiment shown in FIG. 13 can be used. In this embodiment, a polarization insensitive BS is used to split the incoming beam into two parts. In the first part, a PBS is used after the quarter wave plate for polarization analysis. The quarter wave plate's slow (or fast) axis is aligned with the x axis of the PBS in FIG. 7 or the Wollaston prism in FIGS. 8 and 9 to introduce a $\pi/2$ phase retardation. In the second part, a PBS is used without a quarter wave plate for polarization analysis. Similar to Eqs. (22) and (23), the detected photocurrent in PD1 and PD2 are:

$$I_1' = \beta_1(\alpha E_0^2/4)(1 + \sin \Delta\phi) = I_{10}'(1 + \sin \Delta\phi) \quad (25)$$

$$I_2' = \beta_2(\alpha E_0^2/4)(1 - \sin \Delta\phi) = I_{20}'(1 - \sin \Delta\phi) \quad (26)$$

The detected photocurrents in PD3 and PD4 are:

$$I_3 = \beta_3(\alpha E_0^2/4)(1 + \sin \Delta\phi) = I_{30}(1 + \sin \Delta\phi) \quad (27)$$

$$I_4 = \beta_4(\alpha E_0^2/4)(1 - \sin \Delta\phi) = I_{40}(1 - \sin \Delta\phi) \quad (28)$$

Adjusting detection circuit parameters $\beta_1$, $\beta_2$, $\beta_3$, and $\beta_4$ such that $I_{10}' = I_{20}'$ and $I_{30} = I_{40}$, and using balanced amplification, one obtains:

$$V_{12} = G_{12}(I_1' - I_2') = G_{12}I_{10}' \sin \Delta\phi \quad (29)$$

$$V_{34} = G_{34}(I_3 - I_4)G_{34}I_{30} \cos \Delta\phi, \quad (30)$$

where $G_{12}$ and $G_{34}$ are the trans-impedance gain of the balanced detection circuits of detector pairs (PD1,PD2) and (PD3, PD4) respectively. The rotation induced phase can then be obtained as:

$$\Delta\phi = \tan^{-1}[V_{12}G_{34}I_{30}/(V_{34}G_{12}I_{10}')] \quad (31)$$

Adjusting circuit gains $G_{12}$ and $G_{34}$ such that $G_{34}I_{30} = G_{12}I_{10}'$, we obtain:

$$\Delta\phi = \tan^{-1}(V_{12}/V_{34}) \quad (32)$$

In the derivations from Eq. (29) to Eq. (32), balanced detection circuitry as shown in FIG. 12B are used. Alternatively, separate amplifier circuitry as shown in FIG. 12A can also be used. Such a configuration eliminates any power fluctuations of the light source and therefore can be used for making a gyro with highest accuracy. One may use Eq. (32) for obtaining $\Delta\phi$. However, at small rotation rate with a small $\Delta\phi$, $\Delta\phi$ can be obtained using Eq. (29) only. When the absolute value of $\Delta\phi$ approaches $7\pi/2$, Eq. (30) can be used alone for obtaining $\Delta\phi$, because Eq. (29) is at minimum sensitive point as $\Delta\phi$ changes. One may using Eq. (29) and (30) alternatively for obtaining $\Delta\phi$, depending on its absolute value.

Figure 14A:
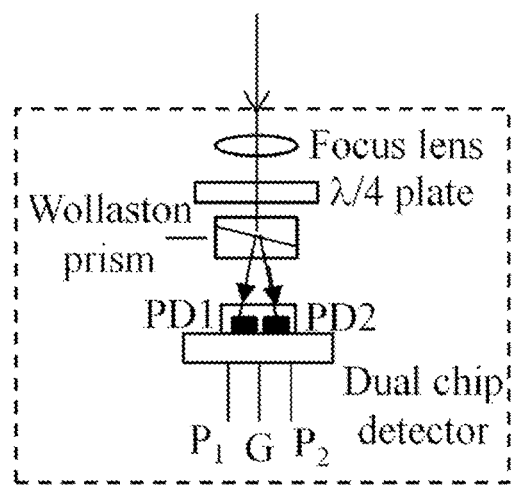
FIGS. 14A and 14B show an example of a fourth implementation of a polarization analyzer in which a Wollaston prism is used to replace the PBS in FIG. 10 and a dual chip photodetector (PD) is used to replace the two separate PDs.
Figure 14B:
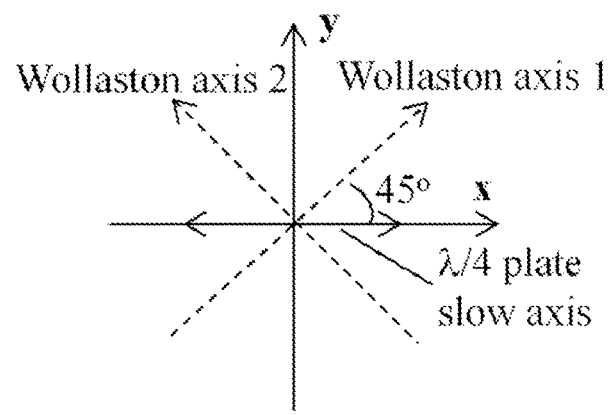

FIG. 14A shows a fourth embodiment of a polarization analyzer in which a Wollaston prism is used to replace the PBS in FIG. 11 and a dual chip photodetector (PD) is used to replace the two separate PDs. The two PD chips in a dual chip detector have a size from 50 to 500 microns and are separated in space by around 50 to 500 microns. Other chip sizes and spacings are also possible. The two chips are electrically isolated from each other. Each of the polarization components of the incoming light beam is focused by a lens on to a corresponding chip to produce a photocurrent. The advantage of this configuration is the small size and low cost. In addition, the Wollaston prism generally has a better polarization extinction ratio that the thin film polarization beam splitting cubes in FIG. 11. FIG. 14B shows the desired directions of the Wollaston prism's axis and the quarter wave plate with respect to the directions x and y of the polarization beam splitter before the fiber coil.

Figure 15A:
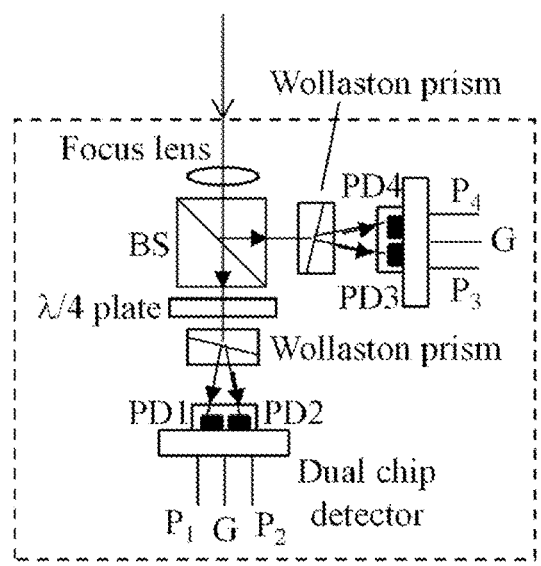
FIGS. 15A and 15B show an example of a fifth implementation of a polarization analyzer in which two Wollaston prisms are used to replace the two PBS' in FIGS. 11A and 11B and two dual chip photodetectors (PD) are used to replace the four separate PDs.
Figure 15B:
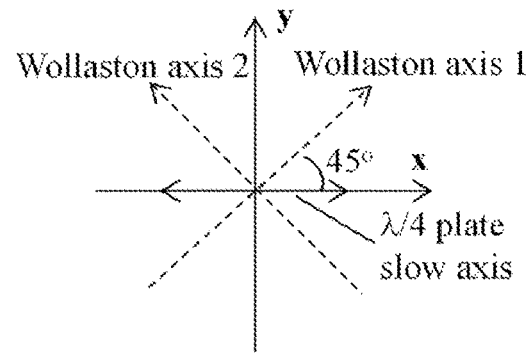

FIG. 15A shows a fifth embodiment of a polarization analyzer in which a Wollaston prism is used to replace the PBS in FIG. 12 and two dual chip photodetector (PD) are used to replace the two pairs of separate PDs. FIG. 15B shows the desired directions of a Wollaston prism's axis and the quarter wave plate with respect to the directions x and y of the polarization beam splitter before the fiber coil. The two Wollaston prisms have the same orientation with respect to x and y directions.

Figure 16:
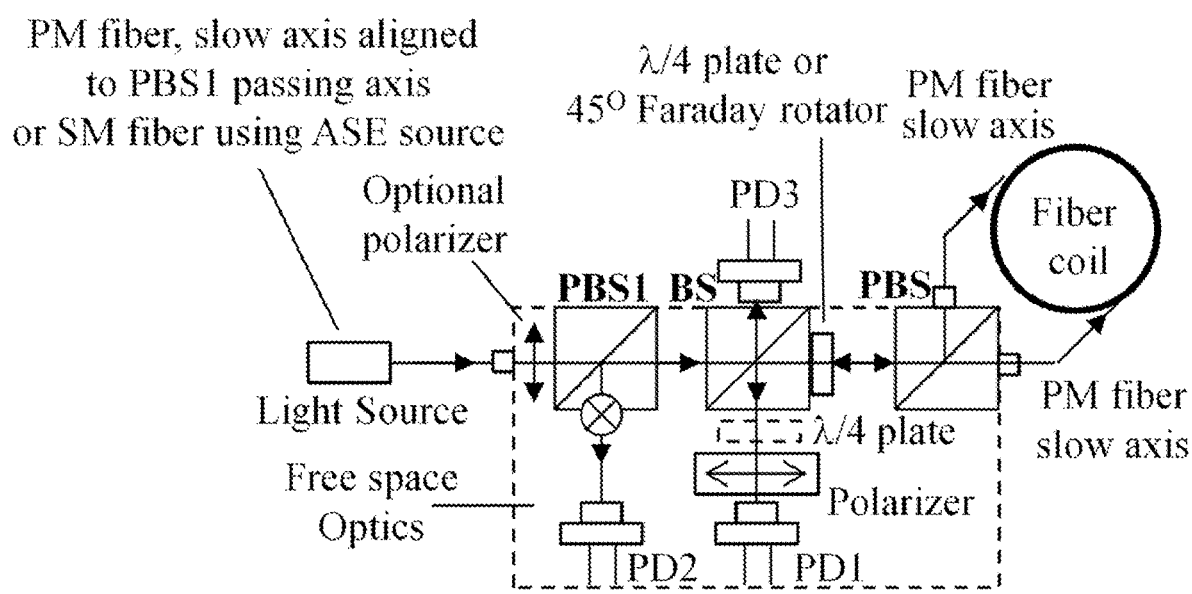
FIG. 16 shows an example of a sixth implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing (PZ) fiber pigtails can be used to replace the two PM fiber pigtails for better performance. If the 45° Faraday rotator is used, instead of the quarter wave plate at the right hand side of BS, a quarter wave plate (dotted line) should be used before the polarizer, where the principal axes of the plate should be aligned with the principal axes (x,y) of the PBS.

FIG. 16 illustrates a sixth implementation of a polarimetric fiber optic gyroscope (P-FOG). In this configuration, the input polarization from the light source is aligned with a principal axis of PBS1 and will pass through PBS1 without any loss. The beam then passes through a polarization insensitive beam splitter (BS) and a quarter wave plate before being split into two orthogonally polarized beams by the PBS. An optional photodetector, PD3, can be used to monitor the optical power from the light source. The quarter wave plate is oriented 45° with respect to the input polarization and the principal axes x and y of PBS. After returning from the fiber coil, part of the beam will be reflected by the BS towards polarizer and PD1. The polarizer is oriented 45° from x and y. The other part will pass through BS and totally reflected by PBS1 towards PD2. The photocurrents generated in PD1 and PD2 are:

$$I_1''=\beta_1(\alpha_1 E_0^2/2)(1-\sin\Delta\phi)=I_{10}''(1-\sin\Delta\phi) \quad (33)$$

$$I_2''=\beta_2(\alpha_2 E_0^2/2)(1+\sin\Delta\phi)=I_{20}''(1+\sin\Delta\phi) \quad (34)$$

where $\beta_i$ is the circuit gain, including the responsivity of PDi and $\alpha_i$ is the optical loss of beam i. $I_{10}''$ and $I_{20}'$ can be obtained when the gyro is stationary ($\Delta\phi=0$), assuming the optical power does not change. To avoid the error induced by power drift, the photocurrent $I_3''$ of PD3 can be used.

Adjusting circuit gains such that $I_3''=I_{10}''=I_{20}''$, the rotation induced phase can be obtained as:

$$\Delta\phi=\tan^{-1}[(I_1''-I_3'')/(I_2''-I_3'')] \quad (35)$$

Because there is a large relative delay between signals in PD3 and signals in PD1 and PD2, caused by the delay of the fiber coil, light source's intensity noise will degrade the measurement accuracy of $\Delta\phi$ in Eq. (35).

In FIG. 16, the light source can also be integrated inside the dotted box in a chip format to reduce the size and cost. In this case, no PM fiber pigtail is required for the light source.

Figure 17:
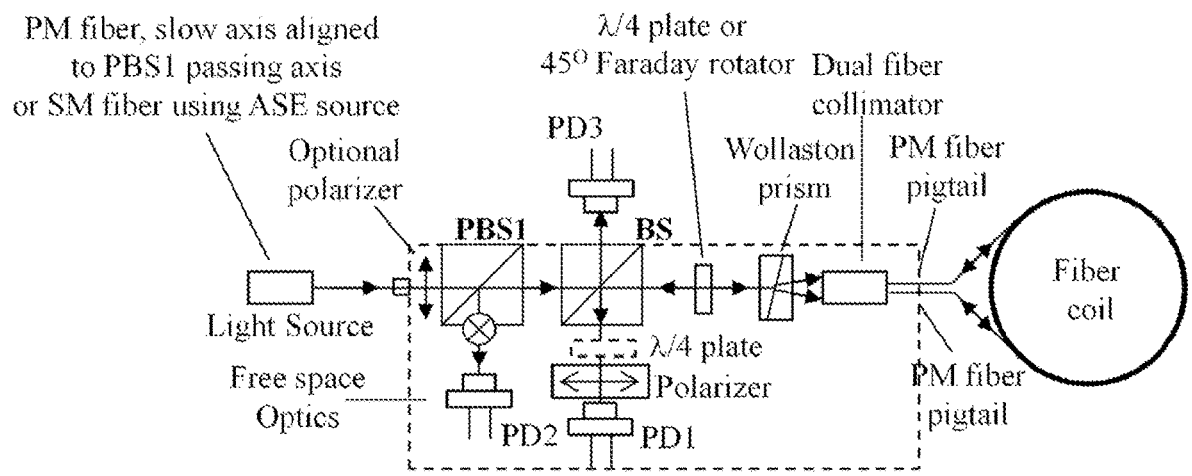
FIG. 17 shows an example of a seventh implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing fiber pigtails can also be used to replace the two PM fiber pigtails for better performance. If the 45° Faraday rotator is used, instead of the quarter wave plate at the right hand side of BS, a different quarter wave plate (dotted line) should be used before the polarizer, where the principal axes of the plate should be aligned with the principal axes (x,y) of the Wollaston prism.

FIG. 17 shows a seventh implementation of a P-FOG, where the PBS cube in FIG. 16 is replaced with a Wollaston prism. The rest are identical to FIG. 16 and Eqs. (33) to (35) still apply.

Figure 18:
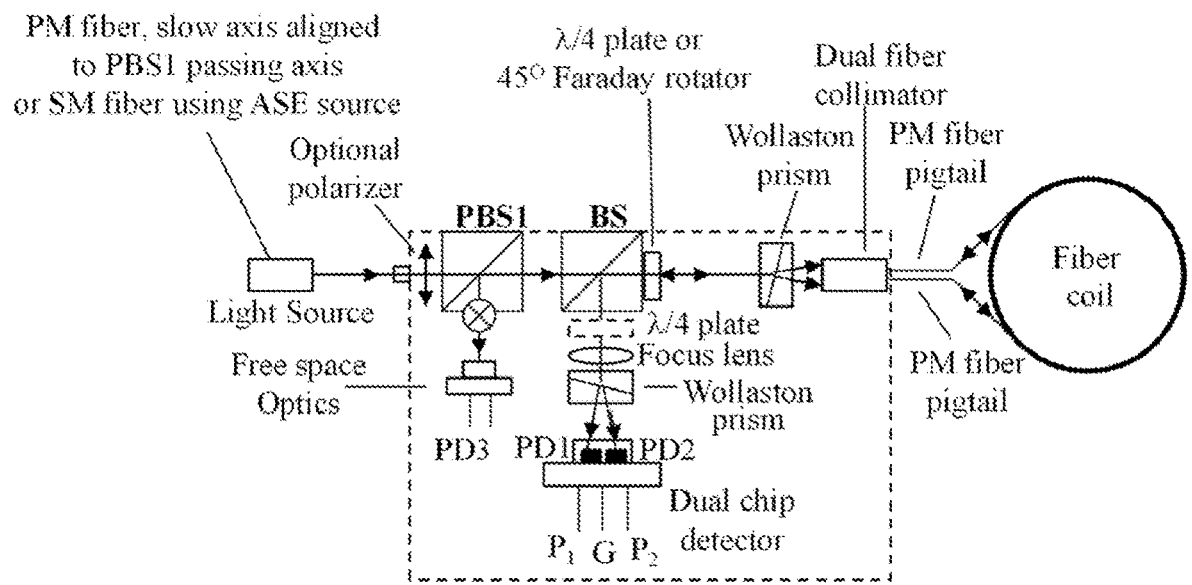
FIG. 18 shows an example of an eighth implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing fiber pigtails can be used to replace the two PM fiber pigtails for better performance. If 45° Faraday rotator is used, instead of the quarter wave plate at the right hand side of BS, a different quarter wave plate should be used before the Wollaston prism, where principal axes of the plate should be aligned with the principal axes (x,y) of the two Wollaston prisms.

FIG. 18 illustrates an eighth implementation of a polarimetric fiber optic gyroscope (P-FOG). This configuration is similar to FIG. 17, except that the polarizer is replaced with a Wollaston prism and a dual chip detector is used to detect the photocurrents of the two polarization components from the prism. A PBS cube can also be used to replace the Wollaston prism. In this case, two separate photodetectors will be used replace the dual chip detector. The photocurrents $J_1$, $J_2$ and $J_3$ in PD1, PD2, and PD3 can be expressed as:

$$J_1=\beta_1(\alpha_1 E_0^2/2)(1-\sin\Delta\phi)=J_{10}(1-\sin\Delta\phi) \quad (36)$$

$$J_2=\beta_2(\alpha_2 E_0^2/2)(1+\sin\Delta\phi)=J_{20}(1+\sin\Delta\phi) \quad (37)$$

$$J_3=\beta_3(\alpha_3 E_0^2/2)(1+\sin\Delta\phi)=J_{30}(1+\sin\Delta\phi) \quad (38)$$

Adjusting the circuit gains such that $J_{10}=J_{20}=J_{30}=J_0$, one obtains:

$$\sin\Delta\phi = (J_2 - J_1)/(J_2 + J_1) \quad (39)$$

$$\cos\Delta\phi = [2J_3/(J_1 + J_2) - 1] \quad (40)$$

$$\Delta\phi = \tan^{-1}\left[\frac{J_2 - J_1}{2J_3 - (J_2 + J_1)}\right] \quad (41)$$

The currents can also be converted into voltages before making the calculations. One may use Eq. (41) for obtaining $\Delta\phi$. However, at small rotation rate with a small $\Delta\phi$, $\Delta\phi$ can be obtained using Eq. (39) only. When the absolute value of $\Delta\phi$ approaches $\pi/2$, Eq. (40) can be used alone for obtaining $\Delta\phi$, because Eq. (39) is at minimum sensitive point as $\Delta\phi$ changes. One may using Eq. (39) and (40) alternatively for obtaining $\Delta\phi$, depending on its absolute value.

In FIGS. 16, 17, and 18, a depolarized light source, such as ASE source, can be used. A single mode (SM) fiber pigtail can be used for the light source. In addition, an optional polarizer may be used to polarized the light before light enters PBS1 in case the extinction ratio of PBS1 is not sufficient.

Figure 19A:
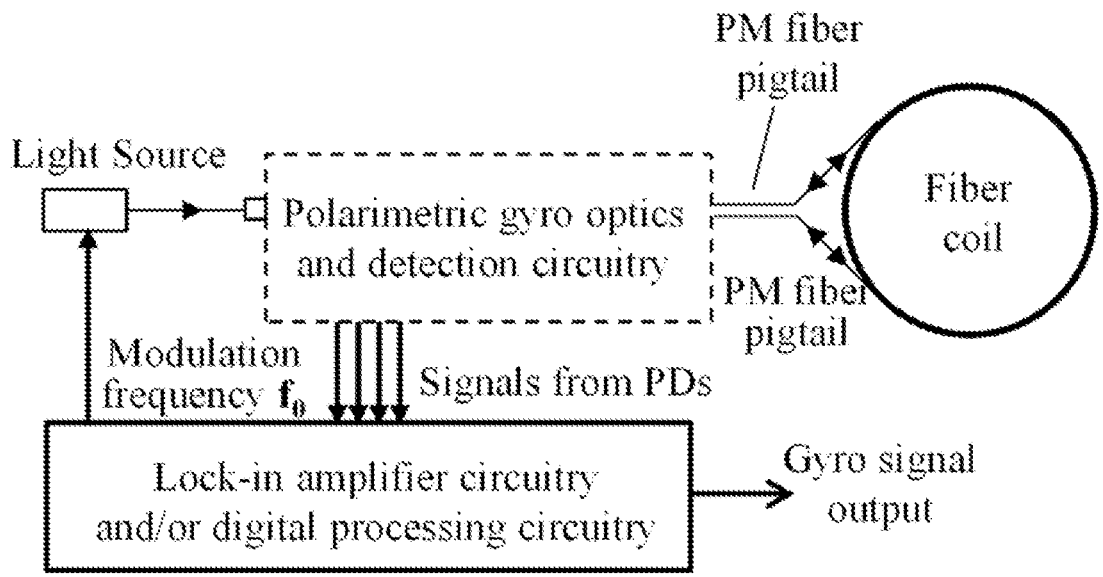
FIGS. 19A and 19B show two examples of detection devices designed to increase signal to noise ratio of the detected signals based on a lock-in amplification circuit.
Figure 19B:
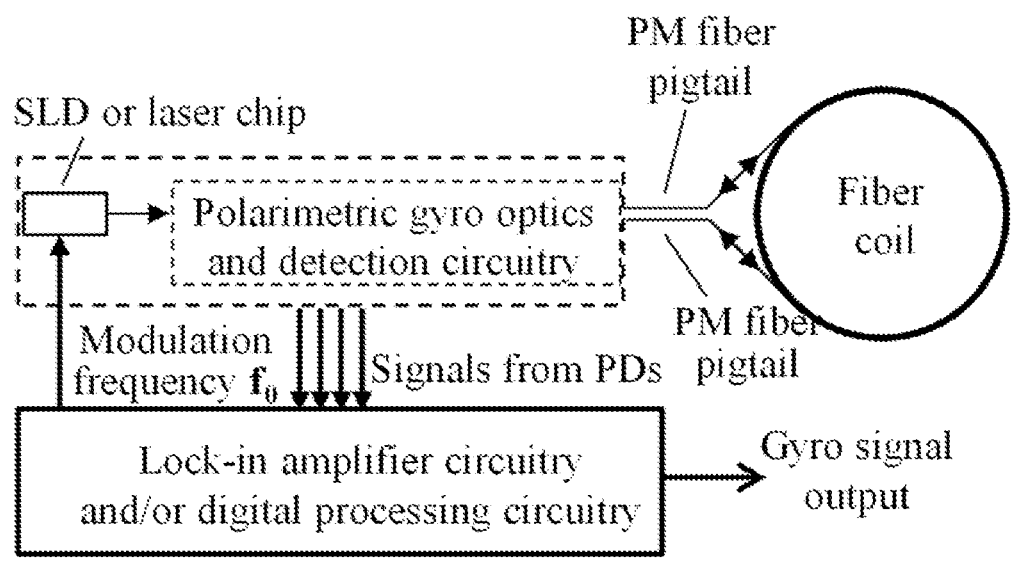

To further increase signal to noise ratio of the detected signals, lock-in amplification circuitry may be deployed, as shown by two device examples in FIGS. 19A and 19B. In this configuration, the lock-in amplifier circuit output a modulation signal with a frequency $f_0$ to modulate the light source and the signals from the PDs in the detection circuitry are fed into a lock-in amplifier with a narrow band pass filter centered at $f_0$. Under this design, the photodetectors can be AC coupled to get rid of DC drift and low frequency noises. The modulation signal can be sine wave, square wave, saw wave, etc. The bandwidth of the band pass filter can be slightly larger than desired detection bandwidth of the gyro, on the order of 1 kHz. Because of the narrow band width, the detection noise can be significantly reduced. This lock-in amplification scheme can apply to other P-FOG configurations disclosed in this patent document. The light source can be external with a pigtail or internal inside the P-FOG optical package without a pigtail, as shown in FIGS. 19A and 19B.

Figure 20A:
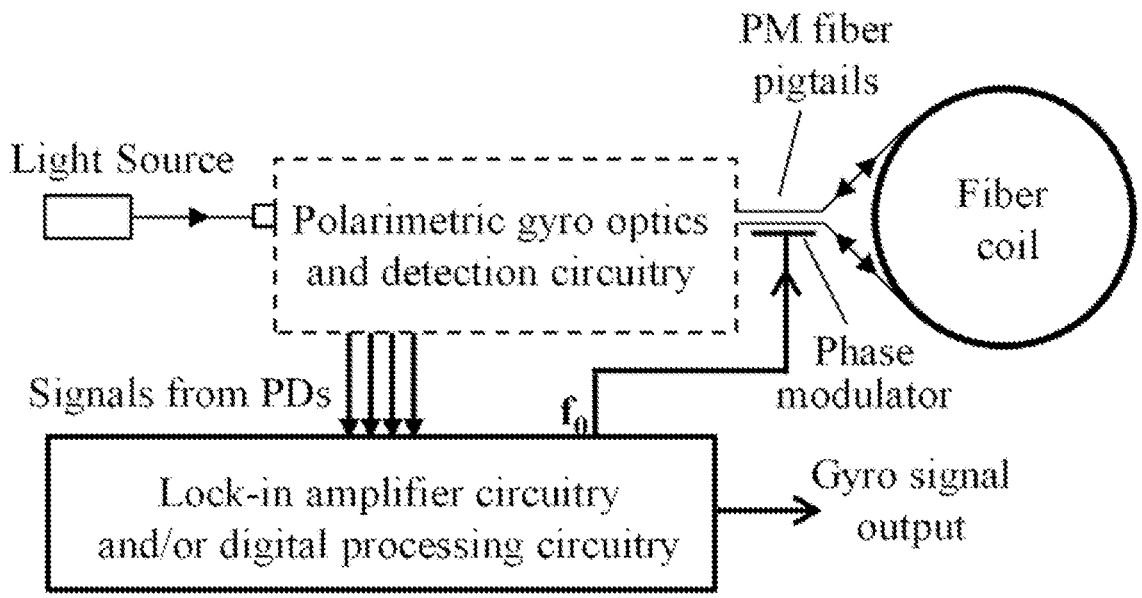
FIGS. 20A and 20B show two examples of detection devices designed to increase signal to noise ratio of the detected signals based on a lock-in amplification circuit and an optical phase modulator.
Figure 20B:
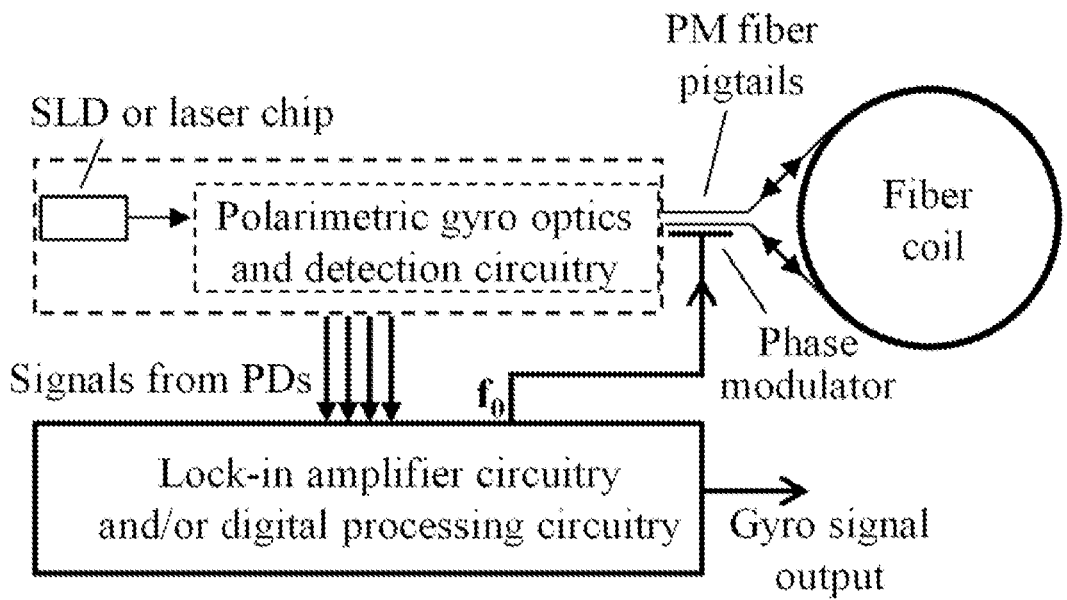

In some implementations, a phase modulator may be added to enable the lock-in amplification for noise reduction, as shown in FIG. 20A and FIG. 20B. This addition of phase modulator can add cost and complication to the resulting gyroscope. Unlike in a conventional IFOG, here the modulation depth can be very small because the gyro is already biased at the most sensitive point. With the phase modulation and lock-in amplification, the DC terms in Eq. (17), Eq. (22), Eq. (23), Eq. (25)-Eq. (28), Eq. (33), Eq. (34), and E. (36)-Eq. (38) can automatically be eliminated. In such cases, configurations of FIG. 10, FIG. 16, and FIG. 17 may be sufficient.

Figure 21:
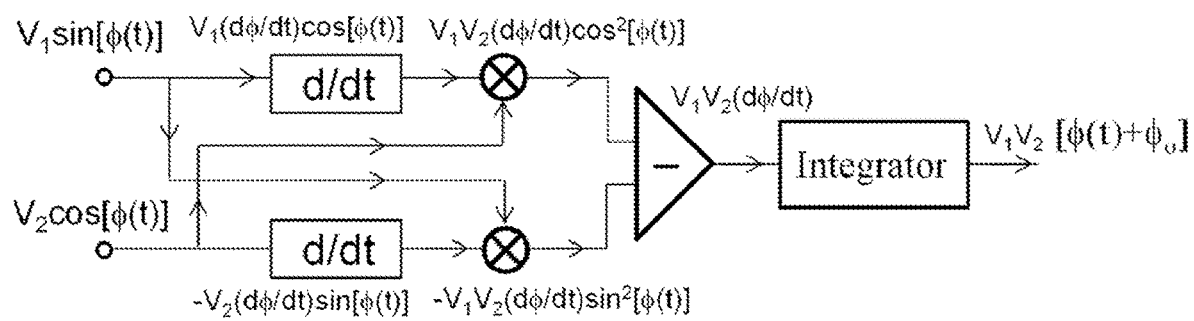
FIG. 21 shows an example of a circuit for the linearization of the detected rotation angle.

FIG. 21 shows a simple circuit to solve the rotation induced phase in Eq. (29) and Eq. (30), where $G_{12}I_{10}'$ and $G_{34}I_{30}$ are represented by V1 and V2 respectively and $\Delta\phi$ is represented by $\phi(t)$. Such a circuit can also be realized by FPGA with firmware. Using such a circuit, very large rotation range can be obtained without encountering non-linearity.

In the above implementation examples, the detection of the optical polarization of the output light from the optical loop can be implemented in various ways. Some examples of optical polarization analyzers or polarimeter devices that may be used for the present optical gyroscopes based on sensing of optical polarization are provided in the following 4 U.S. patents that are incorporated by reference as part of the disclosure of this document:

1. X. Steve Yao, U.S. Pat. No. 6,836,327, "In-line optical polarimeter based on integration of free-space optical elements," 2004.
2. X. Steve Yao, U.S. Pat. No. 7,372,568, "Low cost polametric detector," 2008.
3. X. Steve Yao, U.S. Pat. No. 7,436,569, "Polarization measurement and self-calibration based on multiple tunable optical polarization rotators," 2008.
4. X. Steve Yao, U.S. Pat. No. 7,265,837, "Sensitive polarization monitoring and controlling," 2007.

References made in the above include:
1. V. Vali and R. Shorthill, "Fiber ring interferometer," Appl. Opt. 15, 1099-1100 (1976).

2. H. C. Lefevre, "Fundamental of interferometeric fiber optic gyroscope," in Fiber Optic Gyros: 20 Anniversary Conf., Proc. SPIE 2837, 46-60 (1996).
3. G. A. Sanders, B. Szafraniec, R. Y. Liu, M. S. Bielas, and L. Strandjord, "Fiber-optic gyro development for a broad range of applications," Proc. SPIE, Fiber Optic and Laser Sensors XIII 2510, 2-11(1995).
4. G. A. Sanders, B. Szafraniec, R. Y. Liu, C. L. Laskoskie, L. K. Strandjord, and G. Weed, "Fiber optic gyros for space, marine, and aviation applications," in Fiber Optic Gyros: 20 Anniversary Conf., Proc. SPIE 2837, 61-67 (1996).
5 S. K. Sheem, "Fiber-optic gyroscope with [3×3] directional coupler," Apply. Phys. Lett., Vol. 37, pp. 869-871 (1980).
6. R. A. Bergh, H. C. Lefevre, H. J. Shaw, "All-single-mode fiber optic gyroscope," Opt. Lett., Vol. 6, No. 4, pp. 198-200 (1981).
7. H. C. Lefevre, The Fiber Optic Gyroscope, Artech House, Boston, 1993.
8. Szafraniec, G. A. Sanders, Theory of polarization evolution in interferometric fiber-optic depolarized gyros, Journal of lightwave technology, 1999, 17(4). 579-590.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for sensing rotation based on sensing of optical polarization of light without relying on optical interferometry, comprising:
    splitting an input optical beam with an input optical polarization into a first optical beam with a first optical polarization and a second optical beam with a second optical polarization that is orthogonal to the first optical polarization;
    coupling the first and second optical beams into an input/output port of an optical loop to direct the first optical beam to propagate in the optical loop in a first loop direction and the second optical beam to propagate in the optical loop in a second loop direction opposite to the first loop direction;
    combining light of the first and second optical beams at the input/output port without causing optical interference between the first and second optical beams at the input/output port, to produce a combined optical beam as an optical output of the optical loop for sensing a rotation of the optical loop based on a phase difference $\Delta\phi$ between the two counter propagating optical beams in the optical loop that is caused by the rotation,
    wherein the phase difference $\Delta\phi$ is linearly proportional to a rotation rate of the rotation;
    processing the optical output of the optical loop to obtain information on optical polarization of the optical output, wherein the information includes at least two different Stokes parameters $s_2$ and $s_3$ of the optical output representing a cosine function and a sine function of the phase difference $\Delta\phi$ between the counter propagating optical beams in the optical loop; and
    processing the Stokes parameters $s_2$ and $s_3$ to determine the rotation rate of the optical loop.

2. The method as in claim 1, wherein the processing of the Stokes parameters $s_2$ and $s_3$ to determine the rotation rate of the optical loop includes:
    performing time derivatives of $s_2$ and $s_3$ to produce $ds_2/dt$ and $ds_3/dt$;
    multiplying $s_2$ with $ds_3/dt$, the time derivative of $s_3$, to produce $s_2*ds_3/dt$;
    multiplying $s_3$ with $ds_2/dt$, the time derivative of $s_2$, to produce $s_3*ds_2/dt$;
    subtracting $s_2*ds_3/dt$ and $s_3*ds_2/dt$ to obtain a time derivative of the phase difference $\Delta\phi$ between the two counter propagating optical beams in the optical loop that is caused by the rotation as $d(\Delta\phi)/dt$; and
    integrating $d(\Delta\phi)/dt$ over time to obtain the phase difference $\Delta\phi$.

3. The method as in claim 1, wherein processing the optical output of the optical loop to obtain the information on optical polarization of the optical output includes:
    splitting the optical output into four different optical beams of an equal power level;
    placing a 0-degree polarizer in the first beam, followed by a first photodetector, to produce a first detector signal $P_1$;
    placing a 90-degree polarizer in the second beam, followed by a second photodetector, to produce a second detector signal $P_2$;
    placing a 45-degree polarizer in the third beam, followed by a third photodetector, to produce a third detector signal $P_3$;
    placing a circular polarizer in the fourth beam, followed by a fourth photodetector, to produce a fourth detector signal $P_4$;
    processing the four detector signals to obtain four Stokes parameters as:

$$S_0 = P_1 + P_2,$$

$$s_1 = (P_1 - P_2)/S_0,$$

$$s_2 = \cos(\Delta\phi) = (2P_3 - S_0)/S_0, \text{ and}$$

$$s_3 = \sin(\Delta\phi) = (2P_4 - S_0)/S_0.$$

4. The method as in claim 3, wherein the circular polarizer includes a quarter wave plate followed by a linear polarizer.

5. The method as in claim 1, wherein processing the optical output of the optical loop to obtain the information on optical polarization of the optical output includes:
    splitting the optical output into a first analyzing beam and a second analyzing beam;
    introducing approximately 90 degree phase to the phase difference $\Delta\phi$ between the two counter propagating optical beams in the first analyzing beam;
    splitting the first analyzing beam into a first polarization beam and a second polarization beam orthogonal in polarization to the first polarization beam;

detecting the first polarization beam to produce a first detector signal $V_1$;

detecting the second polarization beam to produce a second detector signal $V_2$;

calculating Stokes parameter $s_3$ from $\sin(\Delta\phi)$ which is a function of $V_1$ and $V_2$;

splitting the second analyzing beam into a third polarization beam and a fourth polarization beam orthogonal to the first polarization beam;

detecting the third polarization beam to produce a third detector signal $V_3$;

detecting the fourth polarization beam to produce a fourth detector signal $V_4$; and calculating the Stokes parameter $s_2$ from $\cos(\Delta\phi)$ which is a function of $V_3$ and $V_4$.

6. The method as in claim 1, comprising:

imposing a signal modulation onto at least one of the first and second optical beams in the optical loop to carry the signal modulation; and using a frequency of the signal modulation and a lock-in amplifier in detecting of the optical output to obtain information on optical polarization of the optical output to reduce detection noise.

7. An optical gyroscope for sensing rotation based on sensing of optical polarization of light without relying on optical interferometry, comprising:

a polarization beam splitter that receives input light to produce a first optical beam with a first polarization and a second optical beam with a second polarization orthogonal in polarization to the first polarization;

a first optical collimator coupled between the polarization beam splitter and a first polarization maintaining fiber to couple the first optical beam into the first polarization maintaining fiber with the first polarization aligned with a polarization axis of the first polarization maintaining fiber;

a second optical collimator coupled between the polarization beam splitter and a second polarization maintaining fiber to couple the second optical beam into the second polarization maintaining fiber with the second polarization aligned with the polarization axis of the second polarization maintaining fiber;

an optical loop coupled to receive light from the first and second polarization maintaining fibers as two counter propagating optical beams in a common polarization in the optical loop, the first coupling lens and second coupling lens coupling the counter propagating optical beams in the optical loop out into the polarization beam splitter which directs light of two counter propagating optical beams from the optical loop to the input optical beam splitter which in turn produces an optical output from the light of two counter propagating optical beams from the optical loop;

a polarization analyzer to receive the optical output from the input optical beam splitter to obtain different Stokes parameters including at least two Stokes parameters $s_2$, and $s_3$ that represent, respectively, cosine and sine functions of a phase difference $\Delta\phi$ between the two counter propagating beams induced by a rotation of the optical loop: $\cos(\Delta\phi)$ and $\sin(\Delta\phi)$; and a processing unit coupled to the polarization analyzer to receive the two Stokes parameters $s_2$, and $s_3$ of the optical output beam and to process the received two Stokes parameters $s_2$, and $s_3$ to obtain the phase difference $\Delta\phi$ and a rotation rate of the optical loop from the phase difference $\Delta\phi$.

8. The optical gyroscope as in claim of 7, wherein the polarization beam splitter is oriented such that the first optical beam and the second optical beam have approximately the same optical power.

9. The optical gyroscope as in claim of 7, comprising a Faraday rotator with 45 degrees rotation angle located in an optical path of the input light before the polarization beam splitter.

10. The optical gyroscope as in claim of 7, comprising a quarter wave plate located in an optical path of the input light and oriented to have with an optical axis at 45 degrees from input polarization of the input light before entering the polarization beam splitter.

\* \* \* \* \*